Jan. 13, 1953  A. WESTIN ET AL  2,625,635
APPARATUS FOR AND METHOD OF TUBE FORMING
Filed June 15, 1949  3 Sheets-Sheet 1
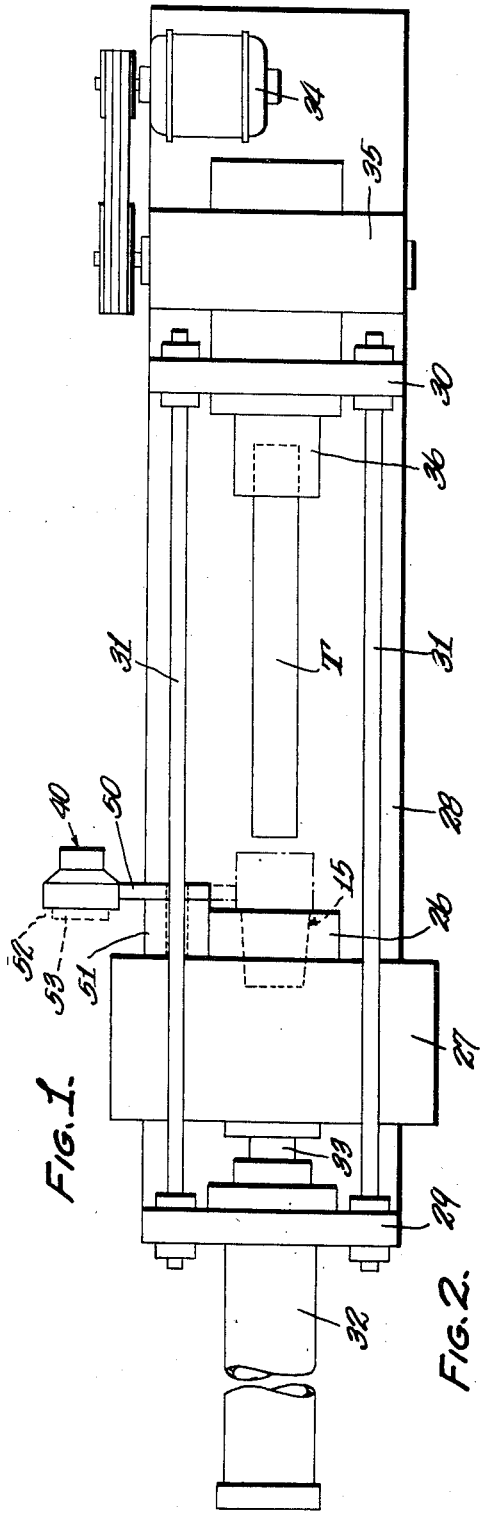
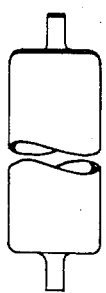
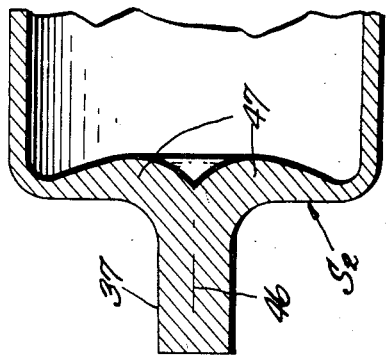
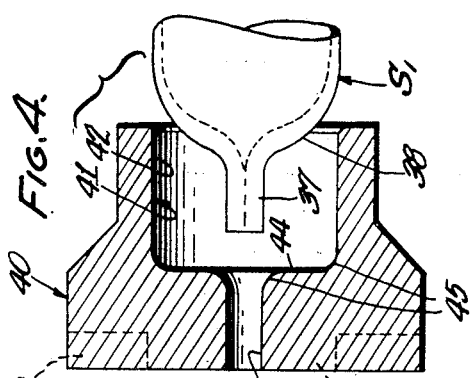
INVENTORS
AXEL WESTIN
and SVEN WESTIN
BY Michael Williams
ATTORNEY

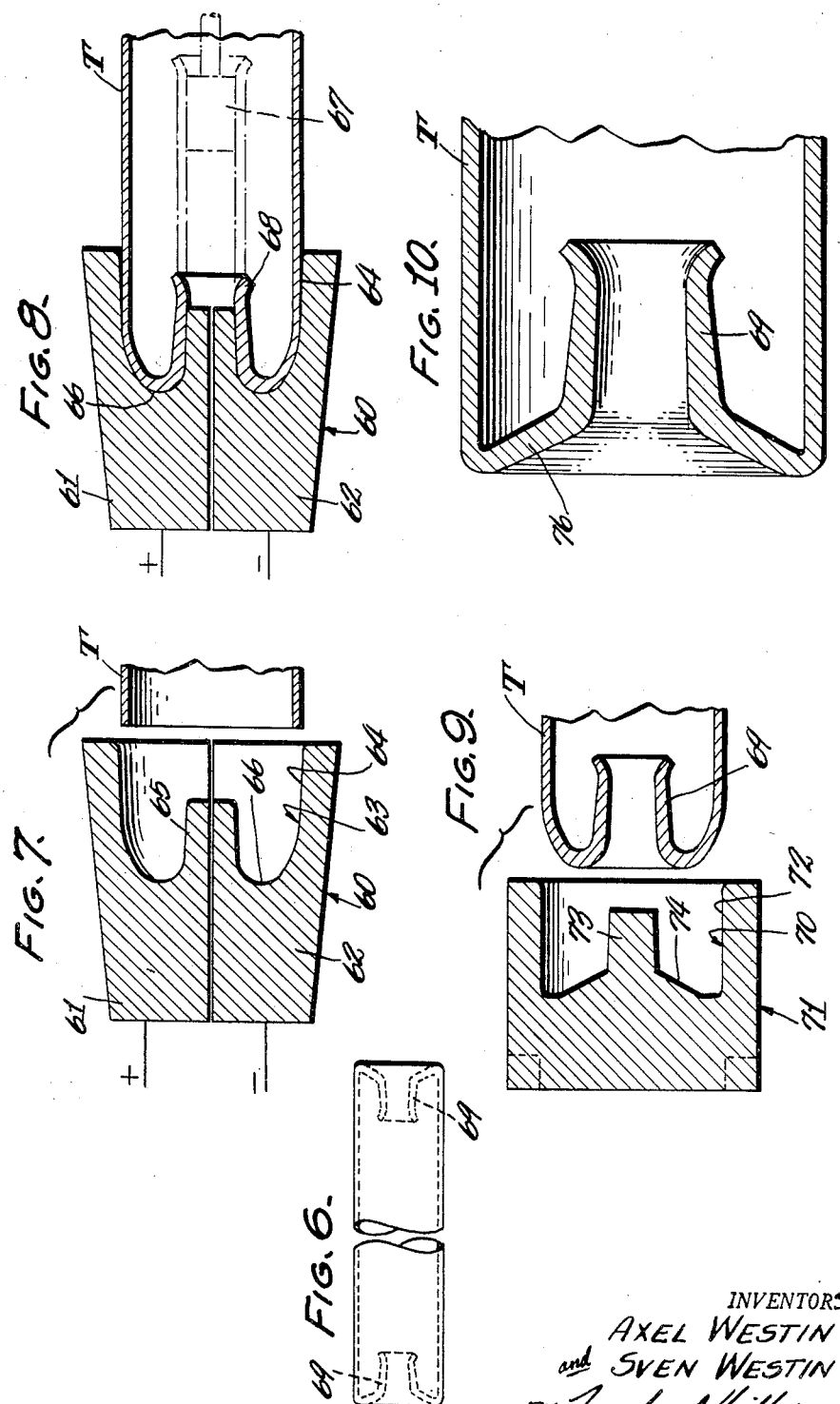

Jan. 13, 1953 A. WESTIN ET AL 2,625,635
APPARATUS FOR AND METHOD OF TUBE FORMING
Filed June 15, 1949 3 Sheets-Sheet 3
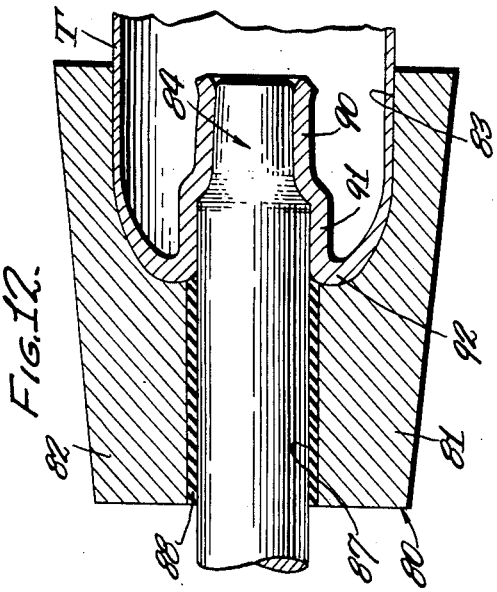
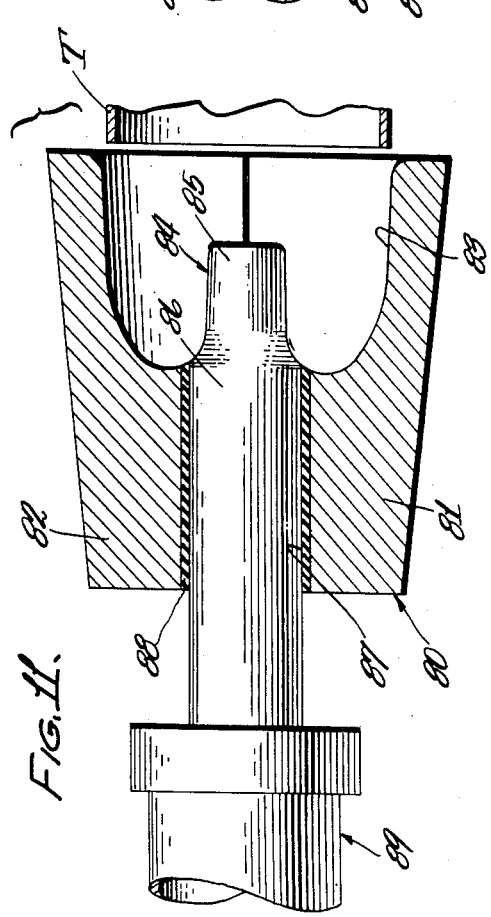
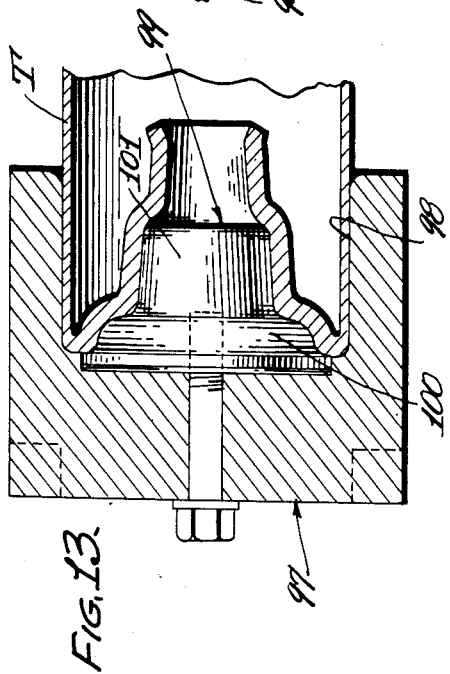
INVENTORS
AXEL WESTIN
SVEN WESTIN
BY *Michael Williams*
ATTORNEY Patented Jan. 13, 1953

2,625,635

UNITED STATES PATENT OFFICE 2,625,635

APPARATUS FOR AND METHOD OF TUBE FORMING

Axel Westin, Milwaukee, and Sven Westin, Elm Grove, Wis., assignors to The Westin Process Company, a partnership Application June 15, 1949, Serial No. 99,217

8 Claims. (Cl. 219—3)

1

Our invention relates to tube forming.

Industry has long sought methods of and means for forming tubes, and more particularly tube ends, easily, quickly and economically into shapes for predetermined uses. By way of example, but by no means by way of limitation, conveyor rolls may be made by use of our invention, such rolls being economically produced from relatively thin wall tubing, yet having ends of sufficient thickness to allow for machining operations which are in certain cases necessary to provide working fit with bearings.

In the drawings accompanying this specification and forming a part of this application, there is shown, for purposes of illustration, several embodiments which our invention may assume, and in these drawings:

Figure 1 is a plan view of apparatus used to carry out our invention,

Figure 2 is a broken elevational view showing an article produced by the apparatus shown in Figure 1, Figure 3 is an enlarged sectional view through a forming die, the tubing being fragmentarily shown and in position for entering the die, Figure 4 is an enlarged sectional view through another forming die used in operating upon the tube end formed in the die shown in Figure 3, the formed end being fragmentarily shown and in position for entering the die, Figure 5 is an enlarged fragmentary sectional view showing an end of the tubing as formed in the die shown in Figure 4, Figure 6 is a broken elevational view of another article produced by the apparatus shown in Figure 1, Figure 7 is an enlarged sectional view through a forming die used in the production of the article shown in Figure 6, the tube being fragmentarily shown and in position for entering the die, Figure 8 is a view similar to Figure 7, showing the tubing as being formed by the die, Figure 9 is an enlarged sectional view through another forming die used in operating upon the tube end formed as shown in Figure 8, the formed end of the tubing being fragmentarily shown and in position for entering the die, Figure 10 is an enlarged fragmentary sectional view showing an end of the tubing as formed in the die shown in Figure 9, Figure 11 is an enlarged sectional view through a forming die used in production of a tube having a reentrant end of stepped formation, the tube being fragmentarily shown and in position for entering the die,

2

Figure 12 is a view similar to Figure 11, showing the formed reentrant end,

Figure 13 is an enlarged sectional view through another forming die which may be used in operation upon the tube end as formed in Figure 12, and Figure 14 is a small scale sectional view through a die of a design slightly different from that shown in Figure 11.

Our invention comprises a method and apparatus for treating tubular bodies by heating such body and applying pressure contact between such body and die means. More specifically our invention comprises a method and apparatus for treating bodies by applying pressure contact between a body and the forming means to effect recurrent engagement between the several parts of the forming means and successive portions of the body to be formed and passing a heating current of electricity through portions of the body from one part of the forming means to another to heat the body and shape it in accordance with a configuration of the forming means. The body thus formed is withdrawn from the forming means and inserted with pressure contact into a second forming means to further shape the body.

Referring particularly to the embodiment of the invention shown in Figures 2 through 5, the die shown in Figure 3 may generally follow the construction of the die disclosed in the patent granted to us, Number 2,309,561, dated January 26, 1943, and entitled Method of Treating Metallic Bodies.

Referring to Figure 3, the die therein shown comprises a metallic block 15 which is split through its center, as shown at 16, to provide sections 17 and 18 insulated from each other by an air gap or by appropriate insulating material within the split 16. The sections 17 and 18 are respectively connected to opposite sides of an electric circuit, as indicated by the lines 19 and 20 so that they will function as positive and negative electrodes.

It will be appreciated that the block may be formed of more than two sections and, as example, it may be formed of three sections when three phase power supply is used, each section being connected to a respective phase of the supply.

The sections 17 and 18, it will be appreciated, provide electrode dies which cooperate to supply a resistance heating current to the end of the tube when such end is positioned in shaping-pressure contact therewith. The sections 17 and 18 further cooperate to form an annular die cavity 21 comprising a generally cylindrical portion 22 entering from one end of the block 15 and merging with a reduced generally cylindrical portion 23 by means of a curved portion 24.

The cylindrical portion 22 is substantially equal to the diameter of the tube T and may include a slight taper and a rounded entrance, as shown at 25, to facilitate insertion of the adjoining end of the tube. Any suitable means may be employed to establish shaping-pressure contact between the tube T and the electrode dies, and in Figure 1 is shown an example of such means.

Referring to Figure 1, the block 15 is removably held in a recess formed in a die carrier 26, the exterior surface of the block and the surface of the recess preferably having complementary tapering surfaces. The die carrier 26 is carried by a head 27 which is held to slidable movement longitudinally along a bed 28 in any suitable manner.

Secured to the bed 27 are spaced uprights 29 and 30, and tie rods 31 extend between these uprights to provide rigidity. A fluid cylinder 32 is secured to the upright 29, the ram 33 of the cylinder having connection with the head 27 to provide for advancement or retraction of the head.

Means are provided to effect rotation of the tube T with respect to the electrode dies, and as herein shown such means comprises a motor 34 having driving connection with a speed reducer 35. The speed reducer carries and effects rotation of a chuck 36 which may be of the quickly engageable-releasable type, such as commercially available air-operated chucks. The chuck 36 holds one end of the tube T so that the opposite end may be in position to engage the electrode dies.

Assuming the parts to be in the position shown in Figures 1 and 3, with the motor 34 rotating the tube T, the cylinder 32 causing the electrode dies to approach the adjoining tube end, and electric current being supplied to the sections 17 and 18, as the tube end enters the die-cavity 21 it will be pressed into engagement with the walls of the die-cavity and there will be recurrent engagement between the electrode dies 17 and 18 and successive portions of the tube end, whereby the tube end will be heated and because of the shaping pressure applied by the cylinder 32, the tube will be deformed with respect to its original shape, and the material forming the end of the tube will flow and be compacted to follow the contour of the die-cavity, to produce a resultant shape as shown in Figure 4 at $S_1$.

As shown in dotted lines in Figure 4, the walls of the tube end $S_1$ are thickened with respect to the original wall thickness of the tube T, the cylindrical portion 37 being substantially of solid cross-section and the curved portion 38 having thickened walls which form a gradual merger between the substantially solid cylindrical portion 37 and the walls of the adjacent unformed portion of the tube.

When the tube end has been formed to the shape shown at $S_1$, the electrode dies are removed from the tube end, by retraction of the head 27 through reversal of the cylinder 32.

The tube end is now ready for further shaping operation as provided by a die 40 shown in Figure 4. The die 40 provides a die-cavity 41 having a substantially cylindrical portion 42, and a reduced cylindrical portion 43 which is generally of the diameter of the cylindrical portion 37 of the tube end $S_1$, although it may be of slightly less diameter to give the portion 37 a final squeeze. The portions 42 and 43 of the die-cavity 41 are connected by a wall portion 44 which is of generally plane formation and at an angle to the portions 42, 43. In the embodiment herein illustrated, such angle is substantially 90°, and rounded corners 45 connect the wall portion 44 with the portions 42, 43.

The tube end $S_1$ is brought into shaping-pressure contact with the surfaces of the die-cavity 41, to further shape the tube end to the form $S_2$ shown in cross-section in Figure 5. Examination of samples of tubes formed by our improved method has shown that little or no line of demarcation is present at the axis line 46 of the cylindrical end 37, and that the walls of the tube at this point have substantially been welded together. The curved portion 38 of end $S_1$ has been shaped so that the exterior surface thereof is substantially plane and generally at right angles to the cylindrical end 37 and the adjacent unformed portion of the tube, the walls being thickened, as shown at 47 and gradually merging with the wall thickness of the unformed portion of the tube. This provides desirable strength and thickness at the proper places, sufficient stock being present to permit machining of the end $S_2$, if desired.

The apparatus shown in Figure 1 may be utilized for effecting the further forming of the tube end to the shape $S_2$, and the die 40 may be mounted on the head 27 in such manner whereby it may be quickly moved to position for receiving the tube end while such end is still heated from the forming operation in the die 15.

The die 40 may be turret mounted on the head 27 so that it may be easily and accurately moved to position immediately after the die 15 has been retracted sufficiently. As herein shown, the die 40 is carried by an arm 50 which is pivotally mounted on a block 51 carried by the head 27.

After the die 15 has been retracted a sufficient distance with respect to the formed tube end $S_1$, the die 40 may be swung to position shown in dot-dash lines in Figure 1 to bottom on the die 15, and the head 27 may then again be advanced to cause shaping-pressure contact between the die-cavity 41 and the tube end $S_1$. During this operation, it is preferable that the tube T is not rotated.

If desired, the bottom of the die 40 may be shouldered, as shown at 52, to provide a cylindrical projection 53 which closely fits within the cylindrical portion 22 of the die-cavity 21 of the die 15, for the purpose of accurately centering the die 40 with respect to the tube end $S_1$. Under these conditions, it will be appreciated that the pivot joint between the arm 50 and the block 51 will be so constructed and arranged that the die 40 may be moved axially sufficiently to provide clearance between the projection 53 and the adjacent portion of the die 15, and then permit entering movement of the projection 53 with respect to the die-cavity 21.

The article produced by the method and apparatus just described is illustrated in Figure 2, and has both ends formed to the shape shown in Figure 5. This article, it will be appreciated is capable of many uses, one being for use as a conveyor roll. The substantially solid spindles formed by the cylindrical ends 37, and the thickened wall 47 provide sufficient stock for machining operations without sacrificing strength.

In the embodiment shown in Figures 6 through 10 a tube is formed with a reentrant end. Referring to Figure 6, the tube therein shown is formed with reentrant portions at both ends, and this construction may be used in a dead shaft conveyor roll construction, that is where the supporting shafts are stationary and the reentrant portions revolve with respect to such shafts or bearings carried by the shafts. This is contrasted with the article shown in Figure 2, which may be used in a live shaft conveyor roll construction, that is where the cylindrical ends 37 rotate relative to the bearings or supports.

Referring particularly to Figures 7 and 8, the metallic body 60 is in some respects similar to the body 15 hereinbefore described, in that it is split to provide sections 61 and 62, each connectable to respective electrical conductors as before, and insulated from each other by an air gap or by suitable insulation. The body 60 is exteriorly tapered so that it may fit in the tapered recess of a die block, such as the die block 26 of the apparatus shown in Figure 1.

The sections 61 and 62 cooperate to form an annular die-cavity 63 comprising a generally cylindrical portion 64 (which may have a slight outward taper) merging with a reduced generally cylindrical plug portion (also preferably slightly tapered) by means of a curved bottom portion 66, the plug portion 65 extending toward the open end of the die-cavity 63 and being in spaced relation with respect to the wall of the cylindrical portion 64.

With the body 60 in place in the apparatus shown in Figure 1, such apparatus may be operated as before explained, whereby the end of the tube T enters the cylindrical portion 64 and through action of electrical energy supplied to the die electrodes 61, 62, is heated to cause the tube end to follow the wall surface of the die-cavity 63. The extremity of the tube thus follows the curved bottom portion 66 and is reversed in direction and rides over the plug portion 65 and moves inward of the tube T. Such inward movement may be continued for any predetermined length. In Figure 8, a mandrel 67 is shown in broken lines as being positioned in the reentrant portion of the tube, the mandrel being movable, in any suitable manner, with such reentrant portion to maintain it in substantially coaxial relationship with the tube.

In the particular construction shown, the extremity of the reentrant portion is formed with a slight flare 68 which is caused when such extremity, in the forming operation, starts to ride along the plug portion 65. However, following the flare, the reentrant portion of the tube is of uniform diameter regardless of its length. It will be noted that the walls of the reentrant portion are thicker than the unformed walls of the tube.

After a reentrant portion 69 of sufficient length is formed, the tube is withdrawn from the die-cavity 63 and while still heated from the forming operation, is disposed in shaping-pressure relation within a die-cavity 70 of a die 71. This die-cavity comprises a cylindrical portion 72, a plug porton 73, and a generally plane portion 74 disposed at an angle to the foregoing portions, and preferably joined therewith by rounded fillets.

The die 71 may be held in the apparatus and operated in the manner previously described in connection with the die 46. The resultant tube construction is shown in Figure 10, and as there shown the inwardly inclined wall 76 and the reentrant portion 69 are thickened with respect to the wall thickness of the unformed tube and thus provide strength at such parts and also provide sufficient stock for machining purpose.

Referring particularly to Figures 11 and 12, the metallic body 80 is in some respects similar to the body 60 hereinbefore described, in that it is split to provide sections 81 and 82, each connectable to electrical conductors as before, and insulated from each other by an air gap or by suitable insulation. The body 80 may be adapted to fit in the tapered recess of the die block 26 of the apparatus shown in Figure 1.

As in the case of the body 60, the sections 81 and 82 cooperate to form an annular die-cavity 83 which is adapted to turn-in the adjoining end of the rotating tube T as such end moves axially inward of the die-cavity.

The central plug 84, in this case, is mounted for movement in coordination with the in-turning action of the tube end. As shown in Figures 11 and 12, the plug comprises step portions 85 and 86. The plug is movable through a recess 87 in the body 80 and a suitable insulating bushing 88 may be provided as a bearing for the plug. The bushing 88, at least in some cases, may be omitted, and a slight gap may be provided between the peripheral surface of the plug 84 and the adjoining surface of the recess 87.

In Figure 11, the plug 84 is shown connected to the ram of a fluid cylinder 89, and any suitable means (not shown) may be utilized to effect movement of the ram in coordination with the inturning of the tube end. As an example, flow of fluid to the cylinder may be controlled by a solenoid valve which is actuated by an electrical limit switch energized after a predetermined amount of tube stock has entered the die.

The die shown in Figure 11 may be used with the apparatus shown in Figure 1 in a manner hereinbefore described. In operation, as the end of the rotating tube T is brought into shaping pressure contact with the surfaces of the die-cavity 83, the tube end is heated and caused to follow the contour of the die-cavity. After the end of the tube T is turned in, such end then rides over the reduced portion 85 of the plug 84 to provide an annular tubular reentrant portion 90.

After a predetermined amount of tube T has entered the die-cavity 83, fluid under pressure is caused to flow to the cylinder 89 thereby causing extension of the plug 84 in a direction outwardly of the die-cavity 83, in coordination with the movement of the reentrant end of the tube. Such movement causes the enlarged portion 86 of the plug 84 to engage the approaching turned-in portions of the tube, to produce an annular tubular reentrant portion 91. It will be appreciated that the portions 90 and 91 may be made of any desired axial length, such lengths being controlled by the time at which fluid is admitted to the fluid cylinder 89.

As seen in Figure 12, the tubular portion 91 is connected with the unformed wall of the tube T by means of a curved wall 92 which gradually increases in cross-section from the unformed wall of the tube to the annular portion 91, and the annular portions 90, 91 are of greater cross-section than the unformed wall of the tube. This construction is well suited for conveyor roll manufacture, since the portions 90, 91 and 92 provide sufficient strength and wall thickness to provide for subsequent machining operations.

A slightly different construction is shown in Figure 14 for moving the plug 84 in coordination with the tube T, and as therein shown, the plug 84a is formed with a central bore 93 to pass a control rod 94. Adjacent to the extremity of the reduced portion 85a of the plug 84a, the rod 94 is connected to abutment means 95 of any suitable character, the construction being such that the rod 94 may cause radial extension or retraction of the abutment means 95.

In Figure 14, the abutment means 95 is shown in radially extended position wherein it is in position to be engaged by the extremity of the reentrant end, and through such engagement pick up the plug 84a and cause it to move axially with movement of the reentrant extremity. A coil spring 96 may be interposed between suitable abutments to yieldably urge the plug 84a to initial position shown in Figure 14.

The tubing as formed to shape illustrated in Figure 12 may be used as shown, or may be machined for use. However, at least in some cases, it is desirable to subject the tubing to further die-forming operations, preferably utilizing the heat of the first forming operation in a manner as hereinbefore described. Accordingly, a die 97 is provided for such purpose, and such die may be used with the apparatus shown in Figure 1 in a manner hereinbefore described.

The die 97, as herein shown, is provided with a cavity including an entrance portion 98 of a diameted to receive the tube T formed as shown in Figure 12. A plug 99 may be formed either as a separate piece (as shown) or integrally with the die 97, this plug providing a relatively large diameter portion 100 merging with a smaller diameter portion 101, the latter being substantially the size of the inner diameter of the tube portion 91, although it may be slightly larger to size such tube portion. As the tube T is pressed into the cavity of the die 97, the end of the tubing will assume a shape corresponding to the plug 99, as shown in Figure 13. Thereafter, the tube is either ready for use, or may be made ready for use by suitable machining operations.

In view of the foregoing it will be apparent to those skilled in the art that we have accomplished at least the principal object of our invention, and it also will be apparent to those skilled in the art that the embodiments herein described may be variously changed and modified, without departing from the spirit of the invention, and that the invention is capable of uses and has advantages not herein specifically described; hence it will be appreciated that the herein disclosed embodiments are illustrative only, and that our invention is not limited thereto.

We claim:

1. Apparatus for forming a tube end, comprising: first forming means, comprising a plurality of electrode dies which cooperate to form a die surface for shaping said tube end to a first formation, said electrode dies being connectable to a source of electrical energy whereby they are adapted to supply a resistance heating current to said end when said end is in engagement therewith; actuating means for effecting shaping-pressure contact between said dies and said tube end, and for effecting disengagement of said tube end and said dies after said tube end has been shaped to said first formation; rotary means for producing relative rotation between said dies and said tube end at least when they are in shaping-pressure contact; second forming means providing a die surface for further shaping said tube end; and means for aligning said second forming means with said shaped tube end after said actuating means has disengaged said shaped tube end from said first forming means and while said tube end is still heated from the first forming operation, said actuator means being operable to effect shaping-pressure contact between the shaped tube and the die surface of said second forming means to further shape said tube end.

2. Apparatus for forming a tube end, comprising: first forming means providing a plurality of oppositely charged radially opposed electrode forming dies having a die surface shaped to first form said tube end with a reduced end section of substantially cylindrical shape and a curved portion between said reduced end section and the adjacent unformed section of said tube; and a second forming means providing a die-cavity surface shaped to change said curved portion to generally flattened formation and generally angularly disposed between said end section and the unformed adjacent section of said tube, said second means having cylindrical walls at the inner and outer boundaries of said die cavity surface to guide corresponding portions of the blank during flattening of said curved portion therein.

3. Apparatus for forming a tube with an integral reentrant end portion, comprising: forming means having a die-cavity configured to turn-in an end of said tube, and also having a plug positioned for engagement with said turned-in end to complete reentrant formation thereof, said plug being mounted for movement with respect to said forming means and being movable with said tube end.

4. Apparatus for forming a tube with an integral reentrant end portion, comprising: forming means having a die-cavity configured to turn-in an end of said tube, and also having a plug positioned for engagement with said turned-in end to complete reentrant formation thereof, said plug being mounted for movement with respect to said forming means and movable with said tube end, said plug being of varying size and adapted to shape said reentrant end accordingly.

5. Apparatus for forming a tube with an integral reentrant end portion, comprising: forming means having a die-cavity configured to turn-in an end of said tube, and also having a plug positioned for engagement with said turned-in end to complete reentrant formation thereof, said plug being mounted for movement with respect to said forming means; and means for moving said plug in coordination with the inward-turning of said tube end.

6. Apparatus for forming a tube with a reentrant end formation, comprising: forming means, comprising a plurality of electrode dies which cooperate to form a die surface for turning-in an end of said tube, said electrode dies being connectable to a source of electrical energy whereby they are adapted to supply a resistance heating current to said tube end when said tube end is in engagement therewith; plug means movably mounted with respect to an intermediate portion of said die surface and positioned for engagement with said turned-in end to complete reentrant formation thereof; and means for moving said plug means in coordination with the inward-turning of said tube end.

7. Apparatus for forming a tube with a reentrant end of stepped formation, comprising: forming means comprising a plurality of electrode dies which cooperate to form a die surface for turning-in an end of said tube, said electrode dies being connectable to a source of electrical energy whereby they are adapted to supply a resistance heating current to said tube end when said tube end is in engagement therewith; plug means movably mounted with respect to an intermediate portion of said die surface and positioned for engagement with said turned-in end to complete reentrant formation of said end, said plug means being of stepped formation; and means for moving said plug means in coordinato to complete reentrant formation of said end, whereby one portion of said plug means is adapted to initially engage said inturned-end and another portion of said plug means is presented for engagement with a subsequent portion of said in-turned end.

8. The method of forming a hollow cylinder with a closed symmetrically flattened end having a projecting trunnion adapted to support the end of the cylinder as a roller and the like, comprising first progressively electrically heating and closing the end of a hollow cylindrical blank to a generally semi-spherical outward form, thereafter pressing into a die cavity the heated and closed end of the blank to extrude a part of the metal thereof into a central recess of the die to form a cylindrical projection concentric with respect to the cylindrical dimensions of the blank, thereafter inserting said end of the blank into a second die cavity having smaller and larger cylindrical portions corresponding to and adapted to receive and respectively confine said projection of the blank and a cylindrical part of the blank adjacent to said end thereof, and thereafter pressing said blank axially into the second die cavity against a flat face between the cylindrical portions thereof to symmetrically form and flatten the greater part of the heated spherical portion of the blank progressively radially outwardly from said projection and finally to form the corner end of the blank from the remaining part of said spherical portion thereof.

AXEL WESTIN.
SVEN WESTIN.

REFERENCES CITED

The following references are of record in the file of this patent:

UNITED STATES PATENTS

| Number | Name | Date |
|---|---|---|
| 368,837 | Kennedy | Aug. 23, 1887 |
| 537,014 | Burton et al. | Apr. 9, 1895 |
| 1,961,453 | Quarnstrom | June 5, 1934 |
| 2,041,199 | Miller | May 19, 1936 |
| 2,309,561 | Westin et al. | Jan. 26, 1943 |
| 2,313,067 | Heath | Mar. 9, 1943 |
| 2,313,474 | Hill | Mar. 9, 1943 |
| 2,325,480 | Crawford | July 27, 1943 |
| 2,340,784 | Westin et al. | Feb. 1, 1944 |
| 2,345,692 | Westin | Apr. 4, 1944 |
| 2,449,247 | Paucek | Sept. 14, 1948 |